US010565346B1

(12) United States Patent
Suthar et al.

(10) Patent No.: US 10,565,346 B1
(45) Date of Patent: Feb. 18, 2020

(54) PLACEMENT, ROUTING, AND DEADLOCK REMOVAL FOR NETWORK-ON-CHIP USING INTEGER LINEAR PROGRAMMING

(71) Applicant: Xilinx, Inc., San Jose, CA (US)

(72) Inventors: Vishal Suthar, Milpitas, CA (US); Dinesh D. Gaitonde, Fremont, CA (US); Amit Gupta, San Jose, CA (US); Jinny Singh, San Jose, CA (US)

(73) Assignee: XILINX, INC., San Jose, CA (US)

( * ) Notice: Subject to any disclaimer, the term of this patent is extended or adjusted under 35 U.S.C. 154(b) by 218 days.

(21) Appl. No.: 15/640,009

(22) Filed: Jun. 30, 2017

(51) Int. Cl.
*G06F 17/50* (2006.01)

(52) U.S. Cl.
CPC ........ *G06F 17/5077* (2013.01); *G06F 17/505* (2013.01); *G06F 2217/06* (2013.01)

(58) Field of Classification Search
CPC .................................................. G06F 17/5077
USPC .......................................................... 716/104
See application file for complete search history.

(56) References Cited

U.S. PATENT DOCUMENTS

| | | | |
|---|---|---|---|
| 5,648,913 | A | 7/1997 | Bennett et al. |
| 5,659,484 | A | 8/1997 | Bennett et al. |
| 5,971,595 | A | 10/1999 | Grant et al. |
| 6,086,629 | A | 7/2000 | McGettigan et al. |
| 6,308,309 | B1 | 10/2001 | Gan et al. |
| 7,073,149 | B2 | 7/2006 | Knol et al. |
| 7,185,309 | B1 | 2/2007 | Kulkarni et al. |
| 7,251,804 | B1 | 7/2007 | Trimberger |
| 7,281,093 | B1 | 10/2007 | Kulkarni et al. |
| 7,367,007 | B1 | 4/2008 | Sundararajan et al. |
| 7,500,060 | B1 | 3/2009 | Anderson et al. |
| 7,574,680 | B1 | 8/2009 | Kulkarni et al. |
| 7,650,248 | B1 | 1/2010 | Baxter |
| 8,006,021 | B1 | 8/2011 | Li et al. |
| 8,020,163 | B2 | 9/2011 | Nollet et al. |
| 8,104,011 | B1 | 1/2012 | Sundararajan et al. |
| 2015/0154337 | A1* | 6/2015 | Fang ................... G06F 17/5077 716/120 |

OTHER PUBLICATIONS

U.S. Appl. No. 15/623,302, filed Jun. 14, 2017, Fraisse, H., "Incremental Routing for Circuit Designs Using a Sat Router".
Dally, W.J. et al., "Deadlock-Free Message Routing in Multiprocessor Interconnection Networks," In IEEE Trans. on Computers, vol. 36, No. 5, May 1987, pp. 547-553.

(Continued)

*Primary Examiner* — Suresh Memula
(74) *Attorney, Agent, or Firm* — Kevin T. Cuenot

(57) ABSTRACT

Implementing a circuit design can include generating an integer linear programming (ILP) formulation for a routing problem by determining constraints for implementing nets of a circuit design within a programmable network-on-chip (NOC) of an integrated circuit, wherein the constraints include placement constraints and routability constraints for the nets. The nets can be simultaneously placed and routed by executing an ILP solver using a processor to minimize an objective function of the ILP formulation while observing the constraints. The ILP solver maps logical units of the nets to interface circuits of the programmable NOC concurrently with mapping the nets to channels of the programmable NOC.

20 Claims, 6 Drawing Sheets

(56) References Cited

OTHER PUBLICATIONS

Cho, M. et al., "BoxRouter: A New Global Router Based on Box Expansion and Progressive ILP," In ACM Proc. of DAC 2006, Jul. 24-28, 2006, pp. 373-378.
Wood, R. et al., "FPGA Routing and Routability Estimation via Boolean Satisfiability," IEEE Transactions on Very Large Scale Integration (VLSI) Systems, vol. 6, No. 2, Jun. 1998, 10 pg.
Nam, G. et al., "A New FPGA Detailed Routing Approach via Search-Based Boolean Satisfiability," IEEE Transactions on Computer-Aided Design of Intergrated Circuits and Systems, vol. 21, No. 6, Jun. 2002, 11 pg.
McMurchie, L. et al., "PathFinder: A Negotiation-Based Performance-Driven Router for FPGAs," In Proc. ACM/IEEE Int'l. Sym. Field Programmable Gate Arrays, Feb. 1995, 7 pg.
Fraisse, H. et al., "Boolean Satisfiability-Based Routing and Its Applicaiton to Xilinx UltraScale Clock Network," In Proc. of 2016 ACM/SIGDA Int'l. Sym. on Fieldl-Programmable Gate Arrays, Feb. 2016, 6 pg.
Hu, J. et al., "Sidewinder: A Scalable ILP-Based Router," In Proc. of 2008 Int'l. Workshop on System Level Interconnect Prediction, Apr. 5-8, 2008, 7 pg.
Nam, G. et al., "A Comparative Study of Two Boolean Formulations of FPGA Detailed Routing Constraints," IEEE Trans. on Computers, vol. 53, No. 6, Jun. 2004, 9 pg.
U.S. Appl. No. 15/639,485, filed Jun. 30, 2017, Swarbrick, I.A. et al., "Routing Circuit Designs for Implementation Using a Programmable Network on Chip".

\* cited by examiner

PLACEMENT, ROUTING, AND DEADLOCK REMOVAL FOR NETWORK-ON-CHIP USING INTEGER LINEAR PROGRAMMING

TECHNICAL FIELD

This disclosure relates to integrated circuits (ICs) and, more particularly, to placement, routing, and deadlock removal for a network-on-chip (NOC) using integer linear programming.

BACKGROUND

A network-on-chip or "NOC" is a packet-switched communication system or network implemented within an integrated circuit (IC). The NOC facilitates communication between different circuits, processors, and/or intellectual property cores implemented within the IC. Typically, NOCs are implemented using a fixed network topology such as mesh or torus. In the case of an application specific IC (ASIC), for example, the masters and slaves of the NOC are known prior to implementation of the ASIC. Thus, the NOC is custom built to suit the requirements of the application to be implemented within the ASIC.

When implementing a circuit design with a NOC, there may be several competing interests that are independent of one another. These competing interests have been addressed by prioritizing one interest over the other. For example, the NOC is architected by considering a first interest and then considering the competing, second interest only after taking initial steps that address the first interest. This approach inherently favors one interest over the other and often leads to sub-optimal solutions.

SUMMARY

One or more embodiments are directed to methods for implementing a circuit design. In one aspect, a method can include generating, using a processor, an integer linear programming (ILP) formulation for a routing problem by determining constraints for implementing nets of a circuit design within a programmable network-on-chip (NOC) of an integrated circuit (IC), wherein the constraints include placement constraints and routability constraints for the nets. The method can include simultaneously placing and routing the nets by executing, using the processor, an ILP solver using a processor to minimize an objective function of the ILP formulation while observing the constraints. The ILP solver maps logical units of the nets to interface circuits of the programmable NOC concurrently with mapping the nets to channels of the programmable NOC.

One or more embodiments are directed to systems for implementing a circuit design. In one aspect, a system includes a memory configured to store program code and a processor coupled to the memory, wherein the processor, in response to executing the program code, is configured to initiate operations including generating an ILP formulation for a routing problem by determining constraints for implementing nets of a circuit design within a programmable NOC of an IC, wherein the constraints include placement constraints and routability constraints for the nets. The operations can include simultaneously placing and routing the nets by executing an ILP solver to minimize an objective function of the ILP formulation while observing the constraints. The ILP solver maps logical units of the nets to interface circuits of the programmable NOC concurrently with mapping the nets to channels of the programmable NOC.

One or more embodiments are directed to computer program products for implementing a circuit design. In one aspect, a computer program product includes a computer readable storage medium having program code stored thereon. The program code is executable by a processor to perform operations including generating an ILP formulation for a routing problem by determining constraints for implementing nets of a circuit design within a programmable NOC of an IC, wherein the constraints include placement constraints and routability constraints for the nets. The operations can include simultaneously placing and routing the nets by executing an ILP solver to minimize an objective function of the ILP formulation while observing the constraints. The ILP solver maps logical units of the nets to interface circuits of the programmable NOC concurrently with mapping the nets to channels of the programmable NOC.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 4-1 through 4-3 illustrate examples of a legal placement and illegal placements prevented by the placement constraints.

DETAILED DESCRIPTION OF THE DRAWINGS

Figure 1:
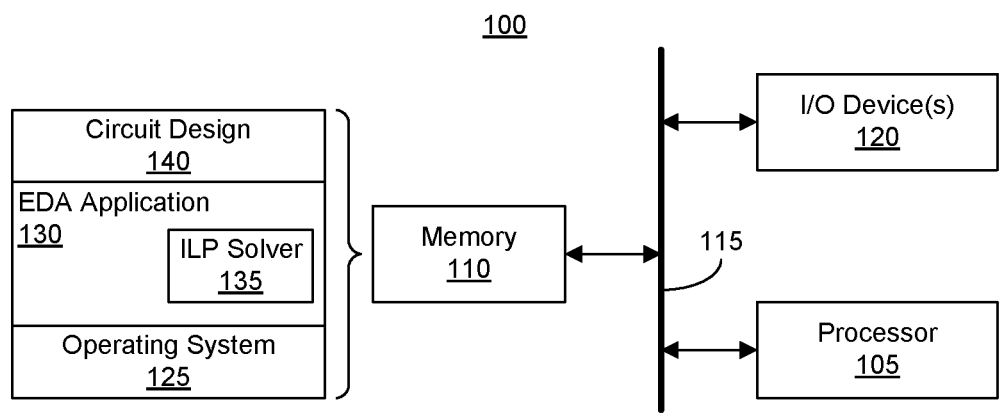
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to placement, routing, and deadlock removal for a network-on-chip (NOC) using integer linear programming (ILP). One or more embodiments described within this disclosure facilitate placement and routing of a circuit design to implement nets within a NOC of an IC. The IC may be a programmable IC such as a field programmable gate array (FPGA). In this regard, the NOC may be a programmable NOC. The circuit design, or portions thereof that use the NOC, can be placed and routed simultaneously using an ILP solver. Multiple independent interests such as latency and bandwidth can be addressed concurrently while simultaneously placing and routing the NOC. By performing placement and routing simultaneously and considering multiple, competing interests concurrently during placement and routing, a higher quality of result can be achieved. The higher quality of result is achieved since routing is not constrained by the placement solution that is determined since one interest is not prioritized so as to constrain implementation options when later addressing a different, independent interest.

In an embodiment, a system is capable of generating one or more constraints for an ILP formulation. The system is capable of using the ILP solver to perform placement and/or routing for a NOC while observing the generated constraints. In an aspect, the constraints are independent of one another. As an illustrative example, the constraints specify latency and bandwidth requirements for nets of the NOC. These requirements are independent of one another since one interest cannot be used to derive the other interest. Since prioritizing one requirement over another independent requirement leads to a suboptimal solution, the example embodiments described herein handle independent constraints such as latency and bandwidth concurrently. Further, placement and/or routing for the NOC are performed concurrently to achieve a higher quality of result.

In another embodiment, cycles that are detected within the routed NOC are broken. Cycles indicate potential deadlock conditions within the routed NOC. In an aspect, nets that are included in cycles are identified. These nets, as noted, are identified post routing. The nets may be assigned to various virtual channels of the NOC to break the cycles. In some cases, channel constraints may be assigned to support the breaking of cycles in the routed NOC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Where considered appropriate, reference numbers are repeated among the figures to indicate corresponding, analogous, or like features.

FIG. 1 illustrates an example of a data processing system (system) 100 for use with one or more embodiments described herein. In an aspect, system 100 is implemented as a computer or other system or device that is suitable for storing and/or executing program code.

System 100 includes at least one processor 105. Processor 105 is coupled to memory 110 through interface circuitry 115. System 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and one or more bulk storage devices. The term "local memory" refers to random access memory (RAM) or other non-persistent memory device(s) generally used during actual execution of the program code. The term "bulk storage device" refers to persistent data storage devices. Examples of a bulk storage device include a hard disk drive (HDD) and a solid state drive (SSD). System 100 may also include one or more cache memories (not shown) that provide temporary storage of at least some program code to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, a network adapter, etc. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores one or more program modules. The program modules may generally include routines, programs, objects, components, logic, and other types of data structures. In the example of FIG. 1, memory 110 stores an operating system 125, an electronic design automation (EDA) application 130, and a circuit design 140.

In one or more embodiments, EDA application 130 is capable of performing one or more or all stages of a design flow (e.g., synthesis, placement, and routing) on circuit design 140 as described herein in greater detail. EDA application 130 further is capable of generating a configuration bitstream from a circuit design for implementation within an IC.

Circuit design 140 may be specified using a hardware description language, as a netlist, or in another suitable format. In the example of FIG. 1, EDA application 130 includes an ILP solver 135. EDA application 130 is executed by system 100 to perform placement, routing, and/or deadlock removal for implementing portions of circuit design 140 using a NOC of the target IC. The NOC may be a programmable NOC. As part of such processes, the system is capable of generating an ILP formulation and executing ILP solver 135 using the ILP formulation to determine a feasible solution for placing, routing, and deadlock removal for the NOC. In an example, placement, routing, and deadlock removal, as performed in relation to the NOC, are separate processes from placement and routing of the circuit design in general. For example, circuit elements of circuit design 140 may be placed and routed for implementation within programmable circuitry of the target IC independently and/or separately from placement and routing of nets to be implemented within the NOC.

In an aspect, operating system 125 and EDA application 130, being implemented in the form of executable program code, are executed by system 100 and, more particularly, by processor 105, to perform the operations described within this disclosure. As such, operating system 125 and EDA application 130 may be considered an integrated part of system 100. Further, it should be appreciated that any data used, generated, and/or operated upon by system 100 (e.g., processor 105) are functional data structures that impart functionality when employed as part of the system.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 2:
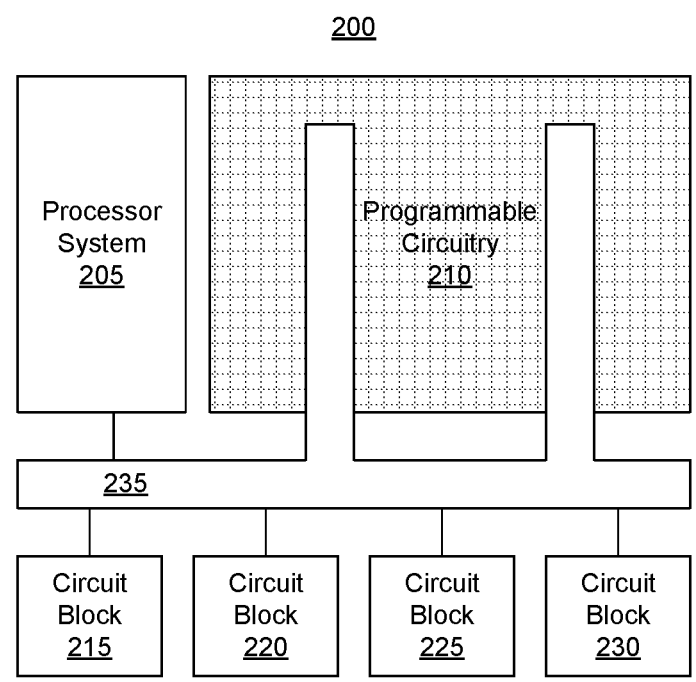
FIG. 2 is an example of an integrated circuit including a network-on-chip (NOC).

FIG. 2 illustrates an example of an IC 200 having a NOC. IC 200 is illustrative of an architecture of a target IC in which a circuit design such as circuit design 140 is implemented. As shown, IC 200 includes a processor system 205, programmable circuitry 210, circuit blocks 215, 220, 225, and 230, and a NOC 235.

In the example of FIG. 2, NOC 235 is a programmable NOC. As such, the nets that are to be routed through the NOC are unknown until a circuit design is created for implementation within the IC. Unlike custom built NOC solutions, the programmable NOC is pre-implemented within the IC. While the programmable NOC itself is not physically modifiable, the programmable NOC may be programmed to establish connectivity between different master circuits and different slave circuits for different user circuit designs. The programmable NOC is capable of adapting to different circuit designs, where each different circuit design has different combinations of master circuits and slave circuits implemented at different locations in the IC.

Processor system 205 is implemented as a hardware circuit that is configured to execute program code. In an aspect, processor system 205 is implemented as dedicated or hardwired circuitry that is fabricated as part of the die that implements IC 200. Processor system 205 may be implemented as any of a variety of different processor types and/or systems ranging in complexity from an individual processor, e.g., a single core capable of executing program code, to an entire processor system having one or more cores, modules, co-processors, interfaces, or the like. In another aspect, processor system 205 is implemented as a "soft-processor" using programmable circuit blocks of IC 200 by way of loading configuration data into IC 200.

Programmable circuitry 210 includes a plurality of programmable circuit blocks. The programmable circuit blocks implementing programmable circuitry 210 are generally arranged in an array. In an embodiment, programmable circuitry 210 is FPGA circuitry. Examples of programmable blocks included in programmable circuitry 210 include, but are not limited to, configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data, e.g., a configuration bitstream, into internal configuration memory cells that define how the programmable elements are configured. The configuration data can be read from memory (e.g., from an external PROM) or written into IC 200 by an external device. The collective states of the individual memory cells then determine the function of the programmable circuitry and/or other circuit blocks of IC 200. The configuration memory cells may control operating modes of processor system 205 and/or circuit blocks 215-230.

Circuit blocks 215-230 represent hardwired and/or dedicated circuit blocks. Circuit blocks 215-230 may be user configurable. Examples of hardwired circuit blocks can include, but are not limited to, IC management resources, random access memory (RAM) such as double data rate (DDR) memory or other suitable memory, a memory controller, high bandwidth (HBM) memory, and video converter circuit blocks. Examples of user configurable hardwired circuit blocks can include but are not limited to, transceivers, input/output (I/O) circuit blocks, and other user defined I/O interfaces.

NOC 235 is a packet switched network that couples processor system 205, programmable circuitry 210 (e.g., user specified circuits implemented within programmable circuitry 210), and circuit blocks 215-230. NOC 235 is implemented as a programmable NOC. As such, NOC 235 may include various components such as switches and arbitration circuits that are programmed by loading NOC configuration data into IC 200. NOC configuration data, for example, is generated by performing placement, routing, and deadlock removal for NOC 235. Because NOC 235 is programmable, route assignments for NOC 235 may be configured at boot-time of IC 200 and/or during run-time of IC 200. That is, route assignments for NOC 235 may be changed dynamically during operation of IC 200. A route assignment or route, for example, defines the switches through which a net passes. In another example, a route assignment may also specify the virtual channel assigned to the net.

In one or more embodiments, NOC 235 is programmed independently of the other portions of IC 200. The NOC configuration data, for example, is independent of configuration data used to program other portions of IC 200 thereby allowing routes for nets within NOC 235 to be changed dynamically during runtime of IC 200 by loading new and/or different NOC configuration data. Route assignments may be changed dynamically during runtime of IC 200 independently of whether other circuitry, e.g., programmable circuitry 210 and/or circuit blocks 215-230, are reconfigured.

As pictured, NOC 235 serves as an on-chip interconnect between the various hardwired circuit resources of IC 200, programmable circuitry 210, and/or different combinations thereof. For example, NOC 235 is capable of routing nets between various combinations of master circuits and slave circuits that serve as interface circuits between NOC 235 and other circuitry whether hardwired circuits, circuits implemented in programmable circuitry, or a combination of both. As such, route assignments implemented in NOC 235 are undetermined until such time that a user circuit design is specified that defines the various circuits to be implemented within programmable circuitry 210 and which of the circuits are to communicate with other circuits of programmable circuitry 210, circuit blocks 215-230, and/or processor system 205.

For example, while one or more portions of a circuit design may require synthesis, placement, and/or routing for implementation within IC 200 (e.g., programmable circuitry 210), nets designated for implementation using NOC 235 undergo another placement and routing process that is specific to NOC 235. Each net implemented in NOC 235 defines communication between a master circuit and a slave circuit. In an embodiment, a system, such as system 100 described in connection with FIG. 1, is capable of determining a placement and routing solution for NOC 235. Further, the system is capable of resolving deadlocks that may exist once NOC 235 is placed and routed.

It should be appreciated that IC 200 is provided for purposes of illustration and not limitation. An IC including a programmable NOC may include more circuit blocks than shown, fewer circuit blocks than shown, different varieties of circuit blocks, and/or different combinations of circuit blocks. For example, some ICs having a programmable NOC may not include a processor system.

Figure 3:
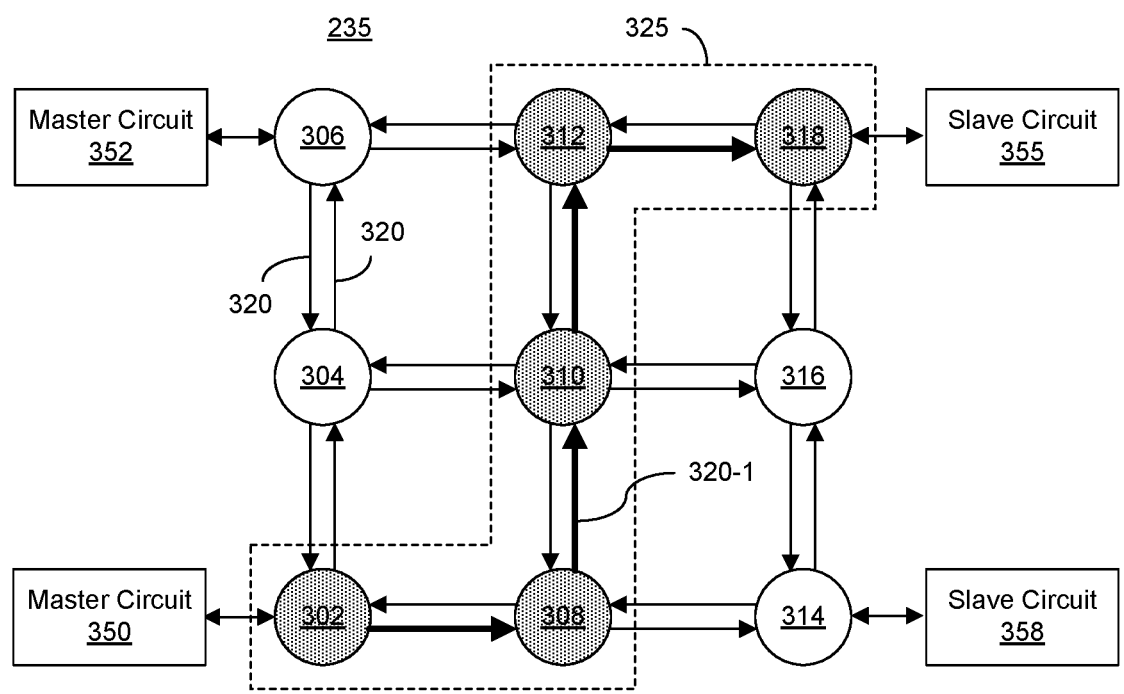
FIG. 3 illustrates an example of a net routed in a programmable NOC.

FIG. 3 illustrates an example net 325 implemented within NOC 235. As noted, NOC 235 is a packet-switched network configured to carry packet-switched data. In the example of FIG. 3, NOC 235 is formed of a plurality of switches 302, 304, 306, 308, 310, 312, 314, 316, and 318. Switches 302-318 are connected by channels 320. Each switch within NOC 235 is a circuit block that is capable of receiving packet-switched data over an incoming channel and routing the packet switched data to one or more different output channels exiting the switch. In an aspect, channels 320 are implemented as multi-bit data paths. Each adjacent pair of switches is connected by two channels.

For example, switch 302 is coupled to switch 308 by a first channel 320 flowing out from switch 302 and into switch 308 and a second channel that flows out from switch 308 and into switch 302. Similarly, switch 302 is coupled to switch 304 by two channels. Switch 302 is coupled to switch 304 by a first channel 320 that flows out from switch 302 and into switch 304 and by a second channel that flows out from switch 304 and into switch 302. Accordingly, switch 302 is capable of receiving packetized data from switch 304 and conveying or routing the received packetized data to switch 308. Similarly, switch 302 is capable of receiving packetized data from switch 308 and conveying or routing the received packetized data to switch 304. In still another example, switch 302 is capable of receiving data from a circuit block within the IC containing NOC 235 and routing the received data to switch 304 or to switch 308. Similarly, switch 302 is capable of receiving data from switch 304 or switch 308 and routing the received data to a circuit block external to NOC 235.

NOC 235 includes a plurality of interface circuit blocks. An interface circuit block couples one or more other circuits, whether hardwired and/or implemented in programmable circuitry, to a switch in NOC 235. For example, through a given interface circuit, two or more different circuit blocks may couple to NOC 235. As such, each interface block may support the entry or exit of one or more nets into and/or out from NOC 235. In the example of FIG. 3, interface circuit blocks are shown as master circuits 350 and 352 and slave circuits 355 and 358. From time-to-time within this disclosure, slave circuits and master circuits are referred to collectively as "interface circuit blocks" or "physical units."

In the example of FIG. 3, master circuit 350 is coupled to switch 302. Master circuit 352 is coupled to switch 306. Slave circuit 355 is coupled to switch 318. Slave circuit 358 is coupled to switch 314. Master circuit 350 and slave circuit 355 may be used as interface circuit blocks for coupling circuits such as processors, memories, other hardwired circuit blocks, and/or circuits implemented in programmable circuitry to NOC 235.

In one or more embodiments, only selected switches of NOC 235 are connected to a master circuit or a slave circuit. For example, switches 304, 312, 316, 306, and 310 are not connected to either a master circuit or a slave circuit. Each net to be routed within NOC 235 must utilize a master circuit and a slave circuit. In the example of FIG. 3, master circuit 350 and slave circuit 355 are used to implement net 325. Master circuit 352 and slave circuit 358 are not used by any net in the example of FIG. 3. It is possible for more than one net to enter and/or exit NOC 235 via a same master circuit and/or a same slave circuit.

In the case of a programmable IC, the particular circuit blocks coupled by nets that communicate though NOC 235 vary from one circuit design to another. As part of placement for NOC 235, the system is capable of assigning the logical elements of the circuit design representing the interface circuit blocks, referred to herein as "logical units," to particular master circuits (e.g., circuit blocks or "sites") and to particular slave circuits (e.g., circuit blocks or "sites"). As such, the logical units, which may be either logical master units or logical slave units, are assigned to particular interface circuit blocks on the target IC.

Accordingly, a circuit design to be implemented within IC 200, e.g., circuit design 140, may include a plurality of nets that need to be placed and routed to utilize NOC 235. Each net to be implemented within NOC 235 uses a master circuit, a slave circuit, and connects the master circuit to the slave circuit via one or more switches of NOC 235.

In the example of FIG. 3, the circuit design may be placed and routed so that elements of the circuit design are assigned to particular locations and/or circuit blocks in IC 200. For example, other circuitry that connects to master circuit 350 and/or slave circuit 355, e.g., circuitry excluding NOC 235, may be placed and routed as is conventionally understood for an FPGA. While circuit design 140 may specify net 325 as a logical master unit and a logical slave unit that are to be connected through NOC 235, net 325 is not yet implemented. The logical units are not yet assigned to interface circuit blocks and the switches implementing net 325 are not yet determined.

The system is capable of placing and routing net 325 using ILP solver 135. The system places net 325 by assigning the logical master unit of net 325 to master circuit 350 and assigning the logical slave unit of net 325 to slave circuit 355. The system routes net 325 to connect master circuit 350 and slave circuit 355 using switches 302, 308, 310, 312, and 318. As noted, placement and routing can be performed concurrently.

In one or more embodiments, the system is capable of generating placement and routability constraints for placing and routing nets through NOC 235. The system encodes the placement and routing constraints into an ILP formulation. ILP solver 135 is capable of determining an assignment of variables to ILP formulation that minimizes an objective function while also observing, or following, the placement and routability constraints.

Examples of placement constraints generated by the system are shown below as expressions 1 and 2.

$$\Sigma_j l_x P_j = 1 \tag{1}$$

$$\Sigma_x l_x P_j \leq 1 \tag{2}$$

Referring to expressions 1 and 2, $l_x$=logical unit and $P_j$=physical unit (e.g., a master circuit or a slave circuit). The placement constraints ensure that each logical master unit is mapped to exactly one master circuit and that each logical slave unit is mapped to exactly one slave circuit. The placement constraints further ensure that each master circuit is mapped to a maximum of one logical master unit and that each slave circuit is mapped to a maximum of one logical slave unit. The placement constraints, therefore, allow that a master circuit or a slave circuit need not be mapped to any logical unit. Accordingly, each logical master unit and each logical slave unit from the circuit design is mapped to exactly one interface circuit block. Further, each slave circuit and each master circuit of the target IC is mapped to at most one logical unit of the circuit design.

Figures 1, 4:
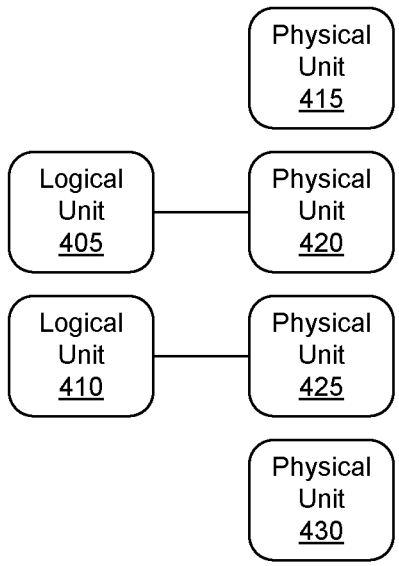
Figures 2, 4:
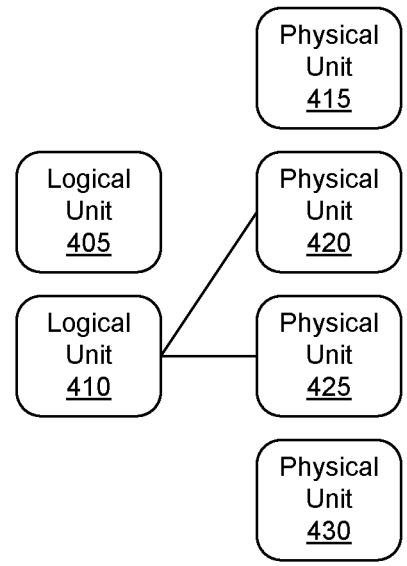
Figures 3, 4:
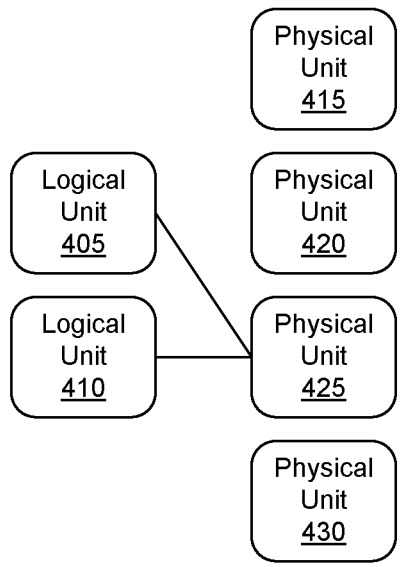

FIGS. 4-1 through 4-3 illustrate examples of a legal placement and illegal placements prevented by the placement constraints. FIG. 4-1 is an example of a legal placement. In the example of FIG. 4-1, logical units 405 and 410 are shown. As noted, logical units 405 and 410 represent the circuit elements of a net of a circuit design that are to be mapped to master and slave circuits of a target IC that couple to the NOC. Further, physical units 415, 420, 425, and 430 are shown. Physical units 415, 420, 425, and 430 represent the master and/or slave circuits of a target IC. Logical unit 405 is mapped to physical unit 420. Logical unit 410 is mapped to physical unit 425. Thus, the placement constraints are met since each logical unit is mapped to exactly one interface circuit block (physical unit) and each interface circuit block (physical unit) is mapped to a maximum of one logical unit.

FIG. 4-2 is an example of an illegal placement that is prevented by the placement constraints. In the example of FIG. 4-2, one logical unit is mapped to more than one physical unit. In particular, logical unit 410 is mapped to both physical units 420 and 425.

FIG. 4-3 is another example of an illegal placement that is prevented by the placement constraints. In the example of FIG. 4-3, one physical unit is mapped to more than one logical unit. In particular, physical unit 425 is mapped to both logical units 405 and 410.

Example routability constraints generated by the system are shown below as expressions 3 and 4.

$$n_x c_i - \Sigma_j n_x c_{ij} = 0 \tag{3}$$

$$n_x c_i - \Sigma_j n_x c_{ji} = 0 \tag{4}$$

Referring to expressions 3 and 4, $c_{ij}$ represents the switches driven by channel $c_i$ and $c_{ji}$ represents the switches driving channel $c_i$. The routability constraints specify that for each channel $c_i$, if net $n_x$ is mapped to channel $c_i$, net $n_x$ should be mapped to exactly one of the switches driven by channel $c_i$. Similarly, for each channel $c_i$, if net $n_x$ is mapped to channel $c_i$, net $n_x$ should be mapped to exactly one of the switches driving channel $c_i$.

Referring again to the example of FIG. 3, the routability constraints ensure that if net 325 is mapped to channel 320-1, net 325 is mapped to exactly one switch driven by channel 320-1 (e.g., switch 310) and is mapped to exactly one switch driving channel 320-1 (e.g., switch 308). The routability constraints are applied to each of the channels mapped to net 325.

An example of an objective function used by the system in solving the ILP formulation is shown below as expression 5.

$$\text{minimize } M * \Sigma_i n_x c_i \tag{5}$$

Referring to expression 5, the value of M can be adjusted to a different value based upon a property of the net. For example, if a net has a property of "low latency," the value of M can be set to 20, e.g., increased. If the property of a net is something other than "low latency," the value of M can be set to 1, e.g., reduced. The values provided for M herein are for purposes of illustration and can be adjusted in other embodiments. Expression 5 uses structural latency. Structural latency is a measure of latency of all of the nets that are routed through the NOC. Appreciably, the value of M can be adjusted to be specific to the latency property of the nets.

In another embodiment, the system is capable of generating latency constraints and including the latency constraints in the ILP formulation. Example latency constraints are shown below in expression 6.

$$L_s \Sigma_j n_x c_{ij} \leq L_{n_x} \tag{6}$$

In expression 6, $L_s$=latency of the switch. For purposes of illustration, the latency is presumed to be 2 cycles. It should be appreciated that the latency of the switches in a NOC will vary from one architecture and/or IC to another. As such, the particular values provided herein are intended for purposes of illustration and not limitation. The latency constraints specify that for each net $n_x$, the sum of the latency of the channels $c_i$ (switches) used by net $n_x$ should be less than or equal to the required latency of the net $L_{n_x}$.

Referring again to the example of FIG. 3, net 325 has 5 switches (switches 302, 308, 310, 312, and 318). If each switch has a latency of 2 cycles, then the total latency of net 325 is 10 cycles. This latency is acceptable and the routing and/or placement of net 325 is acceptable at least with respect to latency so long as the required latency of net 325, as specified by circuit design 140, is 10 cycles or more.

Figure 5:
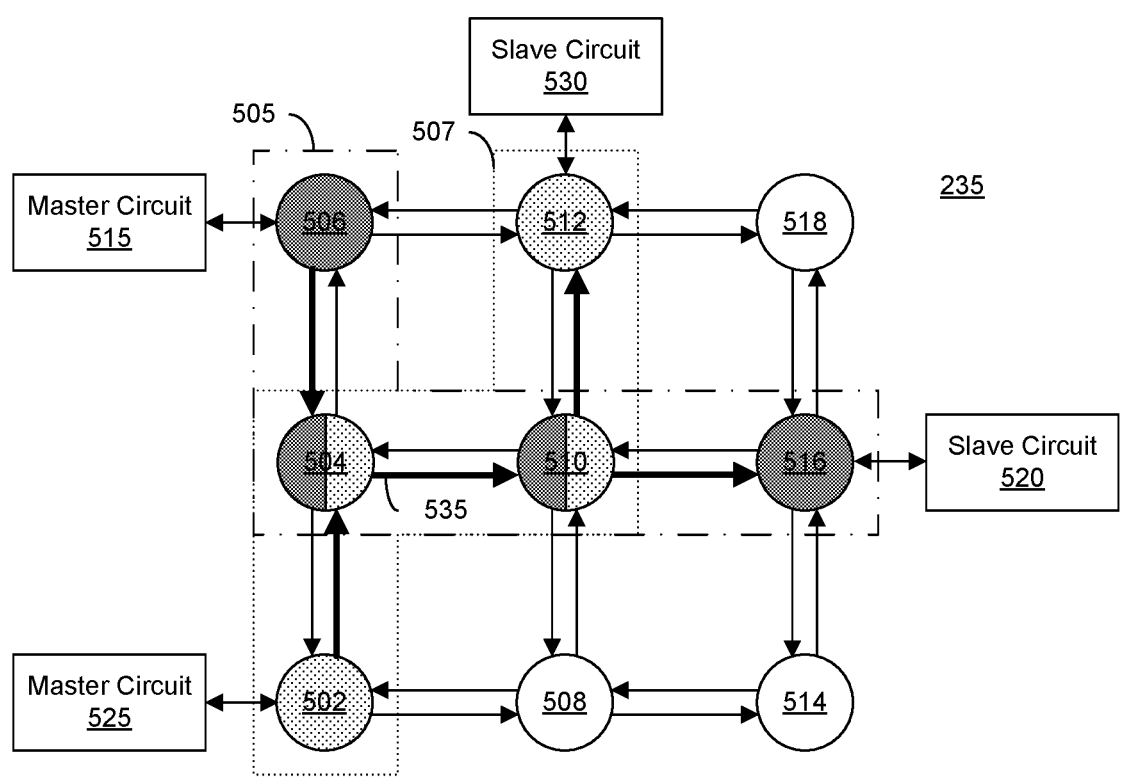
FIG. 5 illustrates example nets routed in a programmable NOC.

FIG. 5 illustrates additional example nets 505 and 507 implemented within NOC 235. In the example of FIG. 5, the system places and routes nets 505 and 507 of circuit design 140 using ILP solver 135. As discussed, the system is capable of placing and routing nets 505 and 507 concurrently. Net 505 includes switches 506, 504, 510, and 516 and the channels connecting switches 506, 504, 510, and 516. Net 505 has a master circuit 515 and a slave circuit 520. Net 507 includes switches 502, 504, 510, and 512 and the channels connecting switches 502, 504, 510, and 512. Net 507 has a master circuit 525 and a slave circuit 530.

FIG. 5 illustrates that two or more nets may use the same switches and channels in certain circumstances. In general, when placing and routing nets for NOC 235, the system is capable of considering bandwidth. For example, each of the channels (e.g., a channel in a particular direction) of NOC 235 has a maximum bandwidth. This maximum bandwidth varies from one NOC architecture and/or IC to another but is known given a particular NOC implementation and/or IC.

Example bandwidth constraints generated by the system are shown below as expression 7.

$$B_{n_x} \Sigma_x n_x c_i \leq B_{c_i} \tag{7}$$

In expression 7, $B_{n_x}$=bandwidth of net $n_x$ and $B_{c_i}$=maximum bandwidth of channel $c_i$.

In the example of FIG. 5, channel 535 (and other channels not enumerated) carries packetized data for both net 505 and net 507. If net 505 has a bandwidth ($B_{n_1}$) of 8 gigabits per second and net 507 has a bandwidth ($B_{n_2}$) of 4 gigabits per second, then the maximum bandwidth ($B_{c_i}$) must be greater than or equal to the sum of the bandwidth of net 505 and net 507 (12 gigabits per second) in order to route both nets 505 and 507 through channel 535. Other than observing the bandwidth constraints, there is no limit as to the number of nets that may be mapped to a channel in the NOC.

Figure 6:
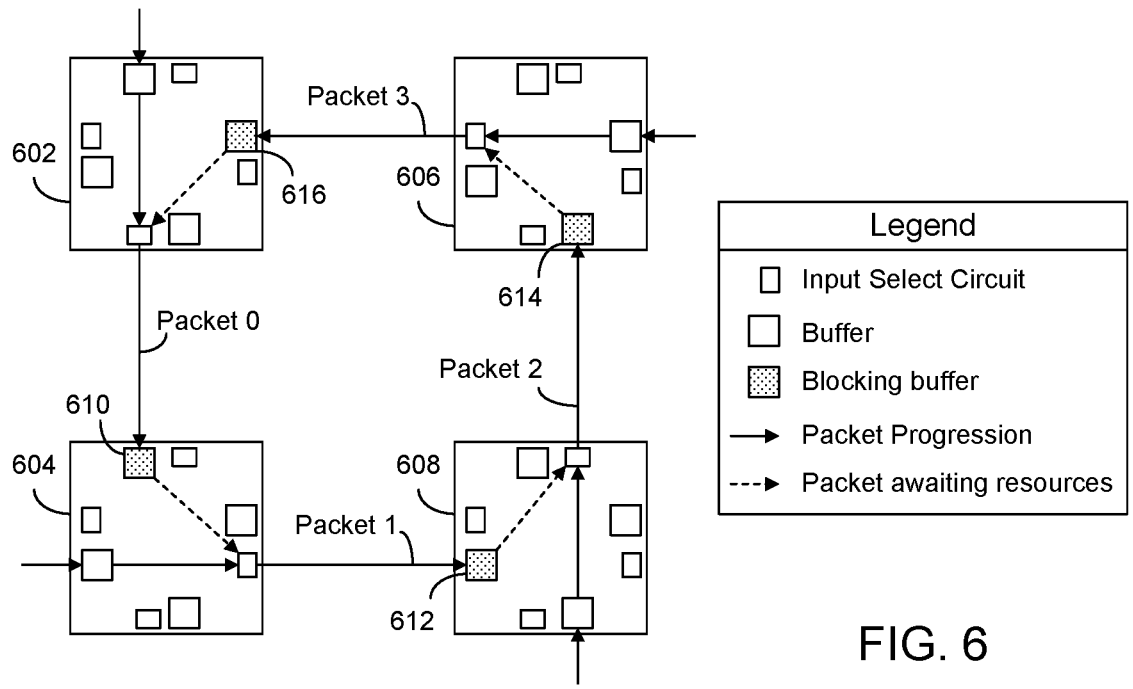
FIG. 6 illustrates an example of a deadlock condition formed within a programmable NOC.

FIG. 6 illustrates an example of a deadlock condition formed within a NOC. The NOC is a programmable NOC. Due to the flexibility of a programmable NOC, nets can be routed that result in cycles. Cycles are indicative of potential deadlock conditions. The NOC of FIG. 6 includes switches 602, 604, 606, and 608. In one or more embodiments, when routing a net, the net may only traverse the NOC by entering a switch through a first channel and leaving the switch through a second and different channel so that a unique path is created for the net from the master circuit to the slave circuit. The creation of multiple paths from the master circuit to the slave circuit for a net is not a legal route for the net. In other words, a route is not permitted to loop back on any given switch of the route. A deadlock condition may exist when routes are created through the NOC that do not observe the loop-back condition. Such deadlocks result from the formation of cycles within the NOC.

Referring to the example of FIG. 6, packet 0 occupies the channel leaving switch 602 and occupies buffer 610 (shown as a blocking buffer) of switch 604. Packet 0 is intended to go onto the channel leaving switch 604, but is blocked by packet 1. Packet 1 already occupies the channel leaving switch 604 and fills buffer 612 (shown as a blocking buffer) of switch 608. Packet 1 is intended to go onto the channel leaving switch 608, but is blocked by packet 2. Packet 2 already occupies the channel leaving switch 608 and fills buffer 614 (shown as a blocking buffer) of switch 606. Packet 2 is intended to go onto the channel leaving switch 606, but is blocked by packet 3. Packet 3 already occupies the channel leaving switch 606 and occupies buffer 616 (shown as a blocking buffer) of switch 602. Packet 3 is intended to go onto the channel leaving switch 602, but is blocked by packet 0.

Thus, none of packets 0-3 is able to move forward due to cyclic dependency. In one or more embodiments, the system is capable of resolving deadlocks by identifying cycles (e.g., closed loops) within the circuit design and applying one or more deadlock removal techniques. The system is capable of applying the deadlock removal techniques post routing of the NOC.

In an embodiment, the system is capable of identifying a cycle created by two or more nets by detecting a closed loop (e.g., four switches in this NOC architecture) where each switch of the closed loop is capable of receiving data from two different sources.

Figure 7:
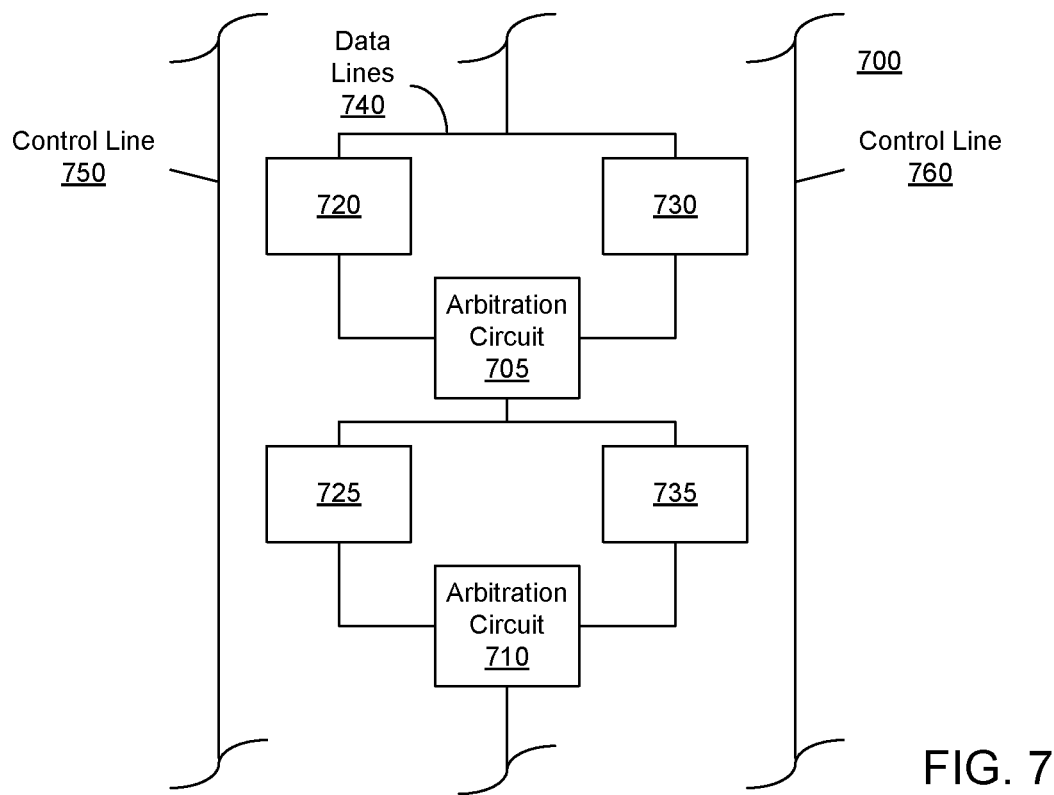
FIG. 7 illustrates an example of channel circuitry of a programmable NOC.

FIG. 7 illustrates an example of channel circuitry 700 for a programmable NOC. Channel circuitry 700 implements two or more virtual channels. As such, each switch within NOC 235 is coupled to another switch in one direction using one physical channel, e.g., channel circuitry 700, with two or more virtual channels for each physical channel. The switches are connected in the opposite direction using another physical channel, e.g., another instance of channel circuitry 700, also having one or more virtual channels.

In the example of FIG. 7, channel circuitry 700 implements two virtual channels. Virtual channels allow a single physical channel to carry data for more than one net at a time. As pictured, channel circuitry 700 includes arbitration circuits 705 and 710. Further, channel circuitry 700 includes a first virtual channel formed of buffers 720 and 725 and a second virtual channel formed of buffers 730 and 735. Data lines 740 carry data through buffers 720, 725, 730, and/or 735. Arbitration circuits 705 and 710 determine which data from buffers 720, 725, 730, and 735 is allowed to propagate through channel circuitry 700 at any given time.

Control line 750 conveys control signals for virtual channel 1. For example, control line 750 conveys control signals between a master circuit and a slave circuit connected by the net assigned to virtual channel 1. Control line 760 conveys control signals for virtual channel 2. For example, control line 760 conveys control signals between a master circuit and a slave circuit coupled by the net assigned to virtual channel 2. Though not illustrated, control line 750 may be coupled to buffers 720, 725 and to arbitration circuits 705 and 710. Similarly, control line 760 may be coupled to buffers 730, 735 and to arbitration circuits 705 and 710.

In one or more embodiments, the net assigned to virtual channel 1 and the net assigned to virtual channel 2 utilize different master circuits and different slave circuits. In one or more embodiments, the net assigned to virtual channel 1 and the net assigned to virtual channel 2 use the same master circuit and the same slave circuit. In one or more embodiments, the net assigned to virtual channel 1 and the net assigned to virtual channel 2 use at least one interface circuit that is the same (master or slave) with the other interface circuits being different. It should be appreciated, however, that since each virtual channel is used for a different net, the endpoints of the nets beyond the interface circuits are different for the two nets.

In the example of FIG. 7, two different nets are using channel circuitry 700. The two nets have different priorities and are assigned to different virtual channels. For example, the net assigned to virtual channel 1 (buffers 720 and 725) may have a higher priority than the net assigned to virtual channel 2 (buffers 730 and 735). Accordingly, data for the net of virtual channel 1 propagates through channel circuitry 700 using buffers 720 and 725. Data for the net of virtual channel 2 propagates through channel circuitry 700 using buffers 730 and 735. Using virtual channels within channel circuitry 700 allows higher priority data to pass by lower priority data on the same physical channel circuitry.

As an illustrative example, arbitration circuits 705 and 710 allow data for the net assigned to virtual channel 1 to propagate through channel circuitry 700 while temporarily halting data for the net assigned to virtual channel 2. Thus, arbitration circuit 705 allows data to propagate from buffer 720 to buffer 725. Arbitration circuit 710 allows data to propagate from buffer 725 to a next node. Concurrently, arbitration circuit 705 prevents data from propagating from buffer 730 to buffer 735. Similarly, arbitration circuit 710 prevents data from propagating from buffer 735 to a next node. Control lines 750 and 760 are capable of transmitting control signals and/or data stall signals as appropriate. As such, channel circuitry 700 allows data of the net assigned to virtual channel 1 to overtake and pass data of the net assigned to virtual channel 2 despite the two nets using the same channel circuitry between switches.

By using channel circuitry as described in connection with FIG. 7, different nets may utilize the same physical channel through NOC 235 without having lower priority data delay or obstruct higher priority data. As such, the system is able to utilize assignment of nets to virtual channels as a mechanism for deadlock removal.

In FIG. 7, channel circuitry 700 is shown to include two virtual channels. It should be appreciated that FIG. 7 is provided for purposes of illustration and not limitation. As such, channel circuitry 700 may include more than two virtual channels. For example, channel circuitry 700 may support 2, 4, 8, 16, etc., virtual channels. Such implementations would require additional buffers. Further, control signals may be implemented on a per-virtual channel basis.

Figure 8:
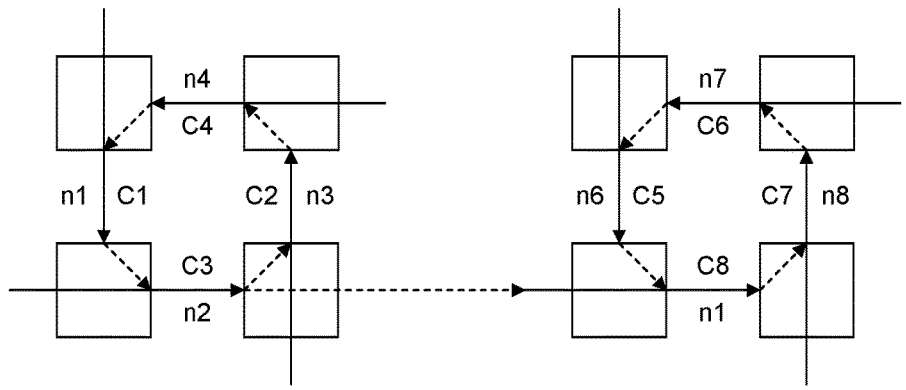
FIG. 8 illustrates another example of a deadlock condition formed within a programmable NOC.

FIG. 8 illustrates another example of a deadlock condition in a programmable NOC. In the example of FIG. 8, nets n1, n2, n3, and n4 are part of one cycle. Nets n1, n6, n7, and n8 are part of another, different cycle. As such, net n1 is part of multiple cycles. As illustrated with reference to FIG. 7, a channel in a NOC may have "x" virtual channels (VCs). In one or more embodiments, the system is capable of generating ILP constraints that prevent all nets in a same cycle from being assigned to a same virtual channel. For example, at least two of the nets included in the cycle are assigned to different virtual channels.

Example constraints generated by the system that prevent all nets of a cycle from being assigned to a same virtual channel are illustrated in expression 8 below.

$$\Sigma_i v_x c_i < \text{Cycle\_length} \tag{8}$$

In expression 8, $v_x c_i$ is a variable representing net(s) on channel $c_i$ using virtual channel $v_x$. If a net is assigned to $VC=v_x$, then the corresponding channel is also assigned to $VC=v_x$.

Accordingly, the system is capable of generating the virtual channel constraints illustrated in expressions 9 and 10 below.

$$\Sigma_i v_x n_i - v_x c_i \geq 0 \tag{9}$$

$$X^* v_x c_i - \Sigma_i v_x n_i \geq 0 \tag{10}$$

The system is capable of solving the example constraints of expressions 9 and 10 to break one or more or all of the cycles within the routing solution. If the system breaks all cycles, the system has found the solution. If one or more cycles, e.g., a sub-set of the cycles initially found to exist in the routing solution, are not broken, the system is capable of applying channel restrictions.

In one or more embodiments, the system is capable of identifying a lower priority net in each remaining cycle. The system puts a restriction on the lower priority net that does not allow the net to use the current channel. Referring to the example of FIG. 8, the system applies a restriction that prevents net n1 from using channel C1 or channel C3.

Figure 9:
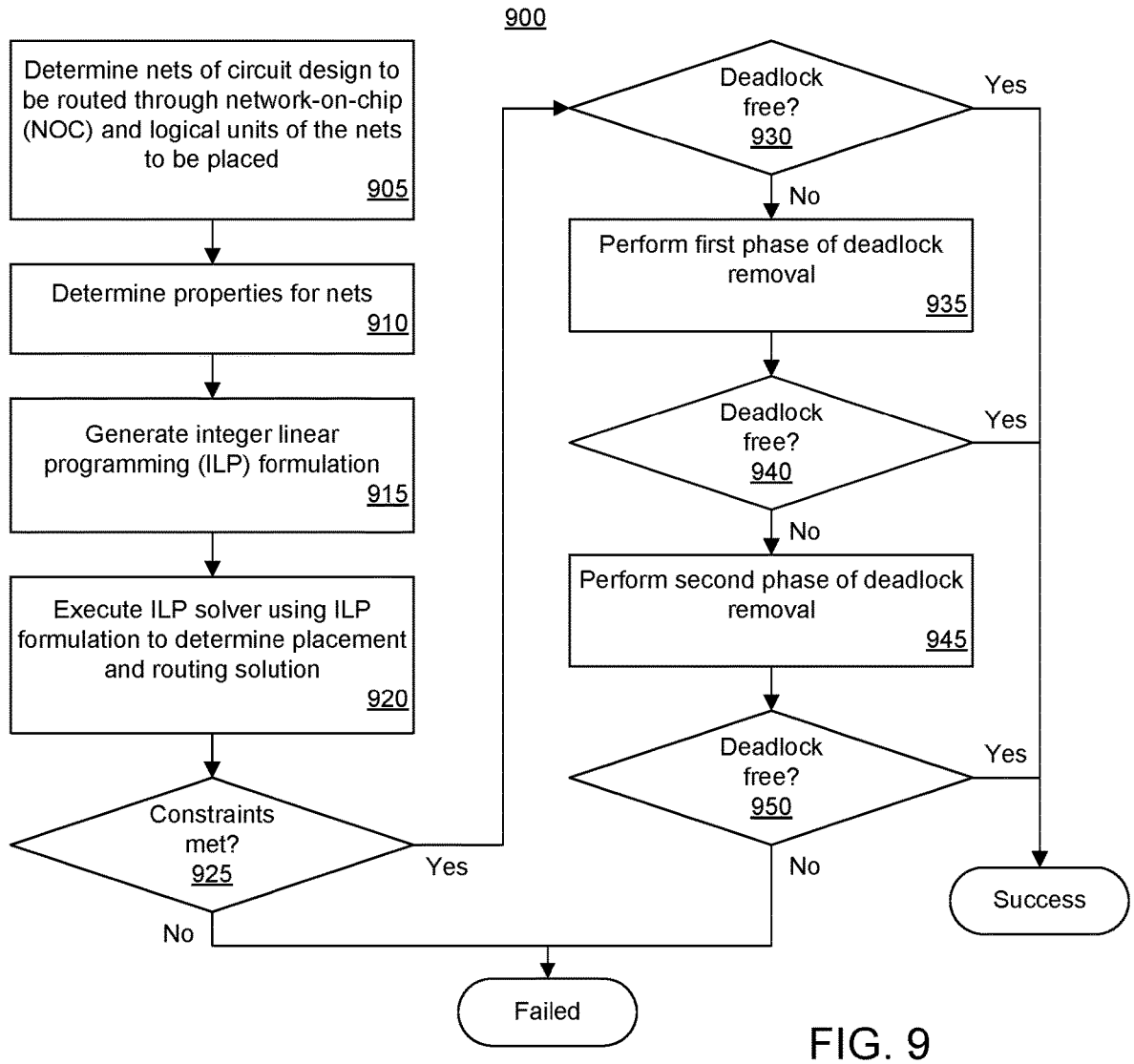
FIG. 9 illustrates an example method of implementing a circuit design.

FIG. 9 illustrates a method 900 of implementing a circuit design. More particularly, method 900 illustrates a method of implementing nets of a circuit design within a programmable NOC. Method 900 may be performed by a system as described herein in connection with FIG. 1 to place and route nets using a programmable NOC.

In block 905, the system determines nets of the circuit design to be routed through the NOC and the logical units of the nets to be placed. The circuit design, for example, specifies those nets, including the logical units (e.g., logical masters and logical slaves) of such nets, that are to be routed through the NOC. In block 910, the system determines properties for the nets. For example, the system determines the required latency and required bandwidth of the nets to be routed through the NOC. The system is also capable of determining one or more other properties of the nets such as, for example, which nets, if any, are low latency and the priorities of the nets to be routed through the NOC. In an embodiment, the system is configured or programmed to include additional data relating to the architecture and/or topography of the NOC such as the maximum bandwidth of channels, the number and location of switches, and so forth that may be needed to generate constraints for an ILP formulation.

In block 915, the system generates an ILP formulation. For example, the system is capable of determining constraints for the ILP formulation. For example, the system generates placement constraints and routability constraints. In an embodiment, the system further generates latency and bandwidth constraints. The ILP formulation, for example, includes the various constraints described herein and the objective function.

In block 920, the system executes an ILP solver using the ILP formulation to determine a placement and routing solution for the nets within the NOC. As discussed, the system determines the placement and the routing for the NOC simultaneously. In performing block 920, the system is capable of mapping the logical units of nets of the circuit design to be routed through the programmable NOC to interface circuits coupled to the programmable NOC. The system, in performing block 920, is further capable of mapping the nets to switches of the programmable NOC concurrently with the placement (e.g., mapping of logical units to interface circuits). The system is capable of performing the placement and routing simultaneously while observing the constraints.

In block 925, the system determines whether the placement and routing solution for the NOC meets the constraints determined in block 915. If so, method 900 continues to block 930. If not, the placement and routing process for the NOC has failed. The placement and routing solution determined in block 920 does not meet the established requirements.

In block 930, the system determines whether the routing solution is deadlock free. If so, method 900 ends in success since the placement and routing solution meets the established requirements and is deadlock free. If not, method 900 continues to block 935.

In block 935, the system performs a first phase of deadlock removal. In the first phase of deadlock removal, the system applies virtual channel constraints. In an embodiment, the system identifies each cycle in the placement and routing solution. For each cycle, the system applies virtual channel constraints to ensure that all nets of the cycle are not assigned to the same virtual channel.

In one or more embodiments, the system generates a further (e.g., a second) ILP formulation specifying the virtual channel constraints. In an aspect, the further second ILP formulation utilizes the routing solution of block 920 and applies the virtual channel constraints thereto. In an aspect, the system is capable of generating the second ILP formulation anew to include the constraints described herein in addition to the virtual channel constraints. The system is capable of performing deadlock removal by executing the ILP solver on the second ILP formulation.

In block 940, the system determines whether the placement and routing solution, after performing block 935, is deadlock free. If so, method 900 ends in success since the placement and routing solution meets the established requirements and is deadlock free. If not, method 900 continues to block 945.

In block 945, the system performs a second phase of deadlock removal. In an embodiment, for each cycle that still remains, the system puts a restriction on a lower priority net. The priority of the net may be a property of the net that the system determines from the circuit design. The restriction on the lower priority net does not allow the net to use a current channel to which the net is mapped.

In one or more embodiments, the system generates a further (e.g., third) ILP formulation to include the constraints described herein. The third ILP formulation can include the various constraints described herein, the virtual channel constraints, and the restriction(s) described with reference to block 945. The system is capable of performing deadlock removal by executing the ILP solver on the third ILP formulation.

In block 950, the system determines whether the placement and routing solution is deadlock free. If so, method 900 ends in success since the placement and routing solution meets the established requirements and is deadlock free. If not, method 900 ends without finding a suitable placement and routing solution since the placement and routing solution includes at least one cycle indicating that the placement and routing solution has at least one potential deadlock.

In the case where the system determines a placement and routing solution for the NOC that meets the established constraints, the system is capable of translating the ILP solution into placement and routing data for the IC to program the NOC. For example, the system translates the ILP solution into NOC configuration data. The NOC configuration data is used to program switches (e.g., routing tables in the switches) and channel circuitry (e.g., arbitration circuits) included within the programmable NOC. By loading the NOC configuration data within the IC, the IC implements the placed and routed nets within the NOC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or switch devices including switch servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for implementing a circuit design. In one aspect, a method can include generating, using a processor, an ILP formulation for a routing problem by determining constraints for implementing nets of a circuit design within a programmable NOC of an IC, wherein the constraints include placement constraints and routability constraints for the nets. The method can include simultaneously placing and routing the nets by executing, using the processor, an ILP solver using a processor to minimize an objective function of the ILP formulation while observing the constraints. The ILP solver maps logical units of the nets to interface circuits of the programmable NOC concurrently with mapping the nets to channels of the programmable NOC.

In an aspect, the placement constraints specify that each logical unit that is a logical master unit must be mapped to exactly one master circuit, each logical unit that is a logical slave unit must be mapped to exactly one slave circuit, each master circuit is mapped to a maximum of one logical master unit, and each slave circuit is mapped to a maximum of one logical slave unit.

In another aspect, the routability constraints specify that for each channel of the programmable NOC, if a net is mapped to the channel, the net is mapped to one switch driven by the channel and one switch driving the channel.

In another aspect, the objective function depends upon latency of all nets through the programmable NOC.

In another aspect, determining constraints further includes determining a latency constraint for each net specifying that a sum of latencies of the switches used by the net does not exceed a required latency of the net.

In another aspect, determining constraints further includes determining a bandwidth constraint for each channel specifying that a sum of required bandwidths of all nets mapped to the channel does not exceed a maximum bandwidth of the channel.

In another aspect, the method further includes resolving deadlocks by determining a cycle within the programmable NOC, determining which of the nets are included in the cycle, and assigning a plurality of nets included in the cycle to virtual channels, where at least two of the plurality of nets included in the cycle are assigned to different virtual channels.

In another aspect, resolving deadlocks further includes, in response to determining that the cycle is not broken, assigning a channel restriction to a low priority net of the plurality of nets included in the cycle.

One or more embodiments are directed to systems for implementing a circuit design. In one aspect, a system includes a memory configured to store program code and a processor coupled to the memory, wherein the processor, in response to executing the program code, is configured to initiate operations including generating an ILP formulation for a routing problem by determining constraints for implementing nets of a circuit design within a programmable NOC of an IC, wherein the constraints include placement constraints and routability constraints for the nets. The operations can include simultaneously placing and routing the nets by executing an ILP solver to minimize an objective function of the ILP formulation while observing the constraints. The ILP solver maps logical units of the nets to interface circuits of the programmable NOC concurrently with mapping the nets to channels of the programmable NOC.

In an aspect, the placement constraints specify that each logical unit that is a logical master unit must be mapped to exactly one master circuit, each logical unit that is a logical slave unit must be mapped to exactly one slave circuit, each master circuit is mapped to a maximum of one logical master unit, and each slave circuit is mapped to a maximum of one logical slave unit.

In another aspect, the routability constraints specify that for each channel of the programmable NOC, if a net is mapped to the channel, the net is mapped to one switch driven by the channel and one switch driving the channel.

In another aspect, the objective function depends upon latency of all nets through the programmable NOC.

In another aspect, determining constraints further includes determining a latency constraint for each net specifying that a sum of latencies of the switches used by the net does not exceed a required latency of the net.

In another aspect, determining constraints further includes determining a bandwidth constraint for each channel specifying that a sum of required bandwidths of all nets mapped to the channel does not exceed a maximum bandwidth of the channel.

In another aspect, the processor, in response to executing the program code, is configured to initiate operations including resolving deadlocks by determining a cycle within the programmable NOC, determining which of the nets are included in the cycle, and assigning a plurality of nets included in the cycle to virtual channels, where at least two of the plurality of nets included in the cycle are assigned to different virtual channels.

In another aspect, resolving deadlocks further includes, in response to determining that the cycle is not broken, assigning a channel restriction to a low priority net of the plurality of nets included in the cycle.

One or more embodiments are directed to computer program products for implementing a circuit design. In one aspect, a computer program product includes a computer readable storage medium having program code stored thereon. The program code is executable by a processor to perform operations including generating an ILP formulation for a routing problem by determining constraints for implementing nets of a circuit design within a programmable NOC of an IC, wherein the constraints include placement constraints and routability constraints for the nets. The operations can include simultaneously placing and routing the nets by executing an ILP solver to minimize an objective function of the ILP formulation while observing the constraints. The ILP solver maps logical units of the nets to interface circuits of the programmable NOC concurrently with mapping the nets to channels of the programmable NOC.

In an aspect, the placement constraints specify that each logical unit that is a logical master unit must be mapped to exactly one master circuit, each logical unit that is a logical slave unit must be mapped to exactly one slave circuit, each master circuit is mapped to a maximum of one logical master unit, and each slave circuit is mapped to a maximum of one logical slave unit.

In another aspect, the routability constraints specify that for each channel of the programmable NOC, if a net is mapped to the channel, the net is mapped to one switch driven by the channel and one switch driving the channel.

In another aspect, the objective function depends upon latency of all nets through the programmable NOC.

In another aspect, determining constraints further includes determining a latency constraint for each net specifying that a sum of latencies of the switches used by the net does not exceed a required latency of the net.

In another aspect, determining constraints further includes determining a bandwidth constraint for each channel specifying that a sum of required bandwidths of all nets mapped to the channel does not exceed a maximum bandwidth of the channel.

In another aspect, the operations further include resolving deadlocks by determining a cycle within the programmable NOC, determining which of the nets are included in the cycle, and assigning a plurality of nets included in the cycle to virtual channels, where at least two of the plurality of nets included in the cycle are assigned to different virtual channels.

In another aspect, resolving deadlocks further includes, in response to determining that the cycle is not broken, assigning a channel restriction to a low priority net of the plurality of nets included in the cycle.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of implementing a circuit design, comprising:
generating, using a processor, an integer linear programming formulation for a routing problem by determining constraints for implementing nets of a circuit design within a programmable network-on-chip of an integrated circuit, wherein the constraints include placement constraints and routability constraints for the nets; and
simultaneously placing and routing the nets by executing, using the processor, an integer linear programming solver using a processor to minimize an objective function of the integer linear programming formulation while observing the constraints, wherein the integer linear programming solver maps logical units of the nets to interface circuits of the programmable network-on-chip concurrently with mapping the nets to channels of the programmable network-on-chip.

2. The method of claim 1, wherein the placement constraints specify that:
each logical unit that is a logical master unit must be mapped to exactly one master circuit;
each logical unit that is a logical slave unit must be mapped to exactly one slave circuit;
each master circuit is mapped to a maximum of one logical master unit; and
each slave circuit is mapped to a maximum of one logical slave unit.

3. The method of claim 1, wherein the routability constraints specify that for each channel of the programmable network-on-chip, if a net is mapped to the channel, the net is mapped to one switch driven by the channel and one switch driving the channel.

4. The method of claim 1, wherein the objective function depends upon latency of all nets through the programmable network-on-chip.

5. The method of claim 1, wherein determining constraints further comprises:
determining a latency constraint for each net specifying that a sum of latencies of the switches used by the net does not exceed a required latency of the net.

6. The method of claim 1, wherein determining constraints further comprises:
determining a bandwidth constraint for each channel specifying that a sum of required bandwidths of all nets mapped to the channel does not exceed a maximum bandwidth of the channel.

7. The method of claim 1, further comprising:
resolving deadlocks by determining a cycle within the programmable network-on-chip, determining which of the nets are included in the cycle, and assigning a plurality of nets included in the cycle to virtual channels, where at least two of the plurality of nets included in the cycle are assigned to different virtual channels.

8. The method of claim 7, wherein resolving deadlocks further comprises:
in response to determining that the cycle is not broken, assigning a channel restriction to a low priority net of the plurality of nets included in the cycle.

9. A system, comprising:
a memory configured to store program code; and
a processor coupled to the memory, wherein the processor, in response to executing the program code, is configured to initiate operations for implementing a circuit design including:
generating an integer linear programming formulation for a routing problem by determining constraints for implementing nets of a circuit design within a programmable network-on-chip of an integrated circuit, wherein the constraints include placement constraints and routability constraints for the nets; and
simultaneously placing and routing the nets by executing an integer linear programming solver to minimize an objective function of the integer linear programming formulation while observing the constraints, wherein the integer linear programming solver maps logical units of the nets to interface circuits of the programmable network-on-chip concurrently with mapping the nets to channels of the programmable network-on-chip.

10. The system of claim 9, wherein the placement constraints specify that:
each logical unit that is a logical master unit must be mapped to exactly one master circuit;
each logical unit that is a logical slave unit must be mapped to exactly one slave circuit;
each master circuit is mapped to a maximum of one logical master unit; and
each slave circuit is mapped to a maximum of one logical slave unit.

11. The system of claim 9, wherein the routability constraints specify that for each channel of the programmable network-on-chip, if a net is mapped to the channel, the net is mapped to one switch driven by the channel and one switch driving the channel.

12. The system of claim 9, wherein the objective function determines structural latency of all nets through the programmable network-on-chip.

13. The system of claim 9, wherein determining constraints further comprises:
determining a latency constraint for each net specifying that a sum of latencies of the switches used by the net does not exceed a required latency of the net.

14. The system of claim 9, wherein determining constraints further comprises:
determining a bandwidth constraint for each channel specifying that a sum of required bandwidths of all nets mapped to the channel does not exceed a maximum bandwidth of the channel.

15. The system of claim 9, wherein the processor is configured to initiate operations further including:
resolving deadlocks by determining a cycle within the programmable network-on-chip, determining which of the nets are included in the cycle, and assigning a plurality of nets included in the cycle to virtual channels, where at least two of the plurality of nets included in the cycle are assigned to different virtual channels.

16. The system of claim 15, wherein resolving deadlocks further comprises:
in response to determining that the cycle is not broken, assigning a channel restriction to a low priority net of the plurality of nets included in the cycle.

17. A computer program product comprising a computer readable storage medium having program code stored thereon, the program code executable by a processor to perform operations for implementing a circuit design, comprising:
generating an integer linear programming formulation for a routing problem by determining constraints for implementing nets of a circuit design within a programmable network-on-chip of an integrated circuit, wherein the constraints include placement constraints and routability constraints for the nets; and
simultaneously placing and routing the nets by executing an integer linear programming solver to minimize an objective function of the integer linear programming formulation while observing the constraints, wherein the integer linear programming solver maps logical units of the nets to interface circuits of the programmable network-on-chip concurrently with mapping the nets to channels of the programmable network-on-chip.

18. The computer program product of claim 17, wherein determining constraints further comprises:
determining a latency constraint for each net specifying that a sum of latencies of the switches used by the net does not exceed a required latency of the net.

19. The computer program product of claim 17, wherein determining constraints further comprises:
determining a bandwidth constraint for each channel specifying that a sum of required bandwidths of all nets mapped to the channel does not exceed a maximum bandwidth of the channel.

20. The computer program product of claim 17, wherein the program code is executable by the processor to perform operations further comprising:
resolving deadlocks by determining a cycle within the programmable network-on-chip, determining which of the nets are included in the cycle, and assigning a plurality of nets included in the cycle to virtual channels, where at least two of the plurality of nets included in the cycle are assigned to different virtual channels.

\* \* \* \* \*